UNITED STATES PATENT OFFICE.

JOHN H. KELLOGG, OF BATTLE CREEK, MICHIGAN.

CEREAL COFFEE OR COFFEE SUBSTITUTE.

1,069,266.  Specification of Letters Patent.  Patented Aug. 5, 1913.

No Drawing.  Application filed May 20, 1912.  Serial No. 698,586.

*To all whom it may concern:*

Be it known that I, JOHN H. KELLOGG, a citizen of the United States, residing at the city of Battle Creek, county of Calhoun, and State of Michigan, have invented certain new and useful Improvements in Cereal Coffee or Coffee Substitutes, of which the following is a specification.

This invention relates to improvements in a cereal coffee or coffee substitutes.

The objects of this invention are, to provide a cereal coffee which is easily prepared and one which is made ready for immediate use by adding hot water thereto.

Other objects and many of the advantages of the invention will be apparent from the following description which discloses a preferred form of cereal coffee made in pursuance of the invention and a preferred process for producing the same.

In carrying out my invention, I employ cereal coffee of the well-known class, which may be prepared from different kinds and different combinations of cereals and by different processes.

As there are several so-called cereal coffees more or less suitable for the purpose now on the market, and as the preliminary process of preparing such cereal coffee proper forms no part of my present invention, I do not describe the process of making the same herein. I preferably use the product known on the market as "caramel cereal."

I boil a suitable cereal coffee with a suitable amount of water, preferably for a considerable period of time, about one hour, as the flavor and quality of the product is improved by a considerable period of boiling. The boiling period may be more or less according to conditions. The liquor is then drained and extracted from the grounds and evaporated to a syrup-like consistency. To the extract may be added sugar in such quantities that the final product is suitable for use without the addition of sugar. As, however, sweetened coffee is objectionable to some, the product is also prepared without the addition of the sugar. The condensed liquor or syrup is combined with a granular or equivalent material, preferably roasted wheat or other roasted cereals, either whole or broken as desired. The roasted wheat is preferred as it adds a desirable flavor to the product. The chief function of the granular material when coated with the condensed liquor or extract is to form a vehicle or carrier for the same which may or may not, as desired, contribute to or affect the qualities of the beverage prepared from the cereal coffee. It will be apparent, therefore, that any suitable material may be used to form this vehicle or carrier. The cereal is preferably roasted until it assumes a dark brown color. The extract is mixed with the roasted wheat or granular material until the surface of the grains or granules, as the case may be, is coated with the syrupy material. A suitable quantity of the granular material should be used to carry the syrupy extract on the surface of the grains. This mixture is dried by any suitable process and is then ready for immediate use.

The beverage is prepared merely by adding this product to hot water, the coating on the surface of the grains or granules being quickly dissolved.

The product when dried, may be easily kept for a long period of time and without material loss of strength.

It is thought that the invention and many of its attendant advantages will be understood without further description, and it is apparent that various changes may be made in the form and composition of both the soluble coating and the material constituting the vehicle carrying the coating, as well as in the steps of the preferred process hereinbefore described, without departing from the spirit and scope of the invention or sacrificing any of its advantages.

Having thus described my invention, what I claim as new and desire to secure by Letters Patent is:

1. The process of manufacturing cereal coffee consisting of boiling cereal coffee, extracting the liquor thus obtained, and coating a roasted cereal with the extract.

2. The process of manufacturing cereal coffee consisting of boiling cereal coffee, extracting and evaporating the liquor thus obtained, and coating a roasted cereal with the extract.

3. The process of manufacturing cereal coffee consisting of boiling cereal coffee, extracting and evaporating the liquor thus obtained, coating a roasted cereal with the extract, and drying.

4. The process of manufacturing cereal coffee consisting of boiling cereal coffee, extracting and evaporating the liquor thus obtained to a syrup-like consistency, and coating a roasted cereal with the extract.

5. The process of manufacturing cereal coffee consisting of boiling cereal coffee, extracting and evaporating the liquor thus obtained to a syrup-like consistency, and coating the granules of a roasted cereal in granular form with the extract.

6. The process of manufacturing cereal coffee consisting of boiling cereal coffee, extracting and evaporating the liquor thus obtained to a syrup-like consistency, combining sugar therewith, and coating a roasted cereal with the syrup.

7. The process of manufacturing cereal coffee consisting of boiling cereal coffee, extracting and evaporating the liquor thus obtained to a syrup-like consistency, combining sugar therewith, and coating the granules of a roasted cereal in granular form with the syrup.

8. The process of manufacturing cereal coffee consisting of boiling cereal coffee, extracting and evaporating the liquor thus obtained to a syrup-like consistency, coating a roasted cereal with the extract, and drying.

9. The process of manufacturing cereal coffee consisting of boiling cereal coffee, extracting and evaporating the liquor thus obtained to a syrup-like consistency, coating the granules of a roasted cereal in granular form with the extract, and drying.

10. The process of manufacturing cereal coffee consisting of boiling the coffee until thoroughly steeped, extracting and evaporating the liquor thus obtained to a syrup-like consistency, mixing with roasted wheat to coat the grains with the extract, and drying.

11. The process of manufacturing cereal coffee consisting of boiling the coffee until thoroughly steeped, extracting and evaporating the liquor thus obtained to a syrup-like consistency, and mixing with a suitable material to coat the same with the extract, and drying.

12. The process of manufacturing cereal coffee consisting of boiling the coffee until thoroughly steeped, extracting and evaporating the liquor thus obtained to a syrup-like consistency, mixing with granular material to coat the granules with the extract, and drying.

13. A coffee substitute consisting of a suitable material having a coating of cereal coffee liquor dried upon its surfaces.

14. A coffee substitute consisting of a suitable material having a coating of concentrated cereal coffee liquor dried upon its surfaces.

15. A cereal coffee substitute consisting of roasted cereals having a coating of soluble matter extracted from the cereal coffee.

16. A coffee substitute consisting of roasted cereals coated with a syrup formed of evaporated cereal coffee liquor and sugar dried thereon.

17. A cereal coffee substitute comprising roasted wheat having a coating of soluble matter extracted from a cereal coffee.

18. A coffee substitute consisting of a granular material having a coating of soluble solid matter extracted from a cereal coffee.

19. A cereal coffee substitute consisting of roasted cereals in granular form having a coating of soluble matter extracted from a cereal coffee.

20. A coffee substitute consisting of roasted cereals in granular form coated with a syrup formed of evaporated cereal coffee liquor and sugar dried upon the surfaces of the granules.

In witness whereof, I have hereunto set my hand and seal in the presence of two witnesses.

JOHN H. KELLOGG. [L. S.]

Witnesses:
JESSE ARTHUR,
FLORENCE RUSSELL ARTHUR.

---

Copies of this patent may be obtained for five cents each, by addressing the "Commissioner of Patents, Washington, D. C."